US009369070B2

United States Patent
Hu et al.

(10) Patent No.: US 9,369,070 B2
(45) Date of Patent: Jun. 14, 2016

(54) METHOD FOR CORRECTING TORQUE FOR SUBSTITUTING PERMANENT-SPLIT CAPACITORMOTOR BY ELECTRONICALLY-COMMUTATED MOTOR

(71) Applicant: Zhongshan Broad-Ocean Motor Co., Ltd., Zhongshan (CN)

(72) Inventors: Ge Hu, Zhongshan (CN); Wenqing Bian, Zhongshan (CN)

(73) Assignee: Zhongshan Broad-Ocean Motor Co., Ltd., Zhongshan (CN)

( * ) Notice: Subject to any disclaimer, the term of this patent is extended or adjusted under 35 U.S.C. 154(b) by 334 days.

(21) Appl. No.: 14/194,814

(22) Filed: Mar. 2, 2014

(65) Prior Publication Data
US 2014/0265957 A1 Sep. 18, 2014

(30) Foreign Application Priority Data

Mar. 14, 2013 (CN) .......................... 2013 1 0082334

(51) Int. Cl.
*H02P 7/06* (2006.01)
*H02P 6/08* (2016.01)
*H02P 31/00* (2006.01)

(52) U.S. Cl.
CPC . *H02P 6/08* (2013.01); *H02P 31/00* (2013.01); *H02P 2205/05* (2013.01)

(58) Field of Classification Search
CPC ........................................................ H02P 7/06
USPC ............................... 318/400.15, 400.01, 700
See application file for complete search history.

(56) References Cited

U.S. PATENT DOCUMENTS 5,194,794 A * 3/1993 Shamoto ................... H02P 6/06
180/446
6,624,602 B2 * 9/2003 Ikegami ..................... H02P 6/20
318/400.08

* cited by examiner

*Primary Examiner* — David S Luo
(74) *Attorney, Agent, or Firm* — Matthias Scholl, PC; Matthias Scholl

(57) ABSTRACT

A method for correcting torque including: presetting rotational speed of each gear by corresponding gear input lines of a microprocessor; providing a mechanism to select one rotational speed set; electing N power points within a range of the rated power, acquiring a set of torque data corresponding to each set of the rotational speed at each power point, and storing a total 2×N sets of torque data; allowing the motor to enter the torque correction mode; recording a steady torque Tadj when the motor operates in a steady state; and comparing the steady torque Tadj with a maximum gear torque Tmax, and selecting the set of torque data to which T[M]max belongs when the steady torque Tadj satisfies the relationship: 110%×T[M−1]max<Tadj≤110%×T[M]max, M=1, 2, . . . , N; when M=1, T0max=0.

16 Claims, 6 Drawing Sheets

METHOD FOR CORRECTING TORQUE FOR SUBSTITUTING PERMANENT-SPLIT CAPACITORMOTOR BY ELECTRONICALLY-COMMUTATED MOTOR

CROSS-REFERENCE TO RELATED APPLICATIONS

Pursuant to 35 U.S.C. §119 and the Paris Convention Treaty, this application claims the benefit of Chinese Patent Application No. 201310082334.3 filed Mar. 14, 2013, the contents of which are incorporated herein by reference. Inquiries from the public to applicants or assignees concerning this document or the related applications should be directed to: Matthias Scholl P. C., Attn.: Dr. Matthias Scholl Esq., 14781 Memorial Drive, Suite 1319, Houston, Tex. 77079.

BACKGROUND OF THE INVENTION

1. Field of the Invention

The invention relates to a method for automatically correcting torque for substituting a permanent-split capacitor (PSC) motor by an ECM.

2. Description of the Related Art

A PSC motor having a stable rotational speed for a civil HVAC system is shown in FIG. 1, which takes an indoor unit of the HVAC system as an example. The motor includes four winding gear taps for modulating rotational speeds of two heating fans and two cooling fans, respectively. The rotational speed of the fan is controlled by the control board of the stove. The control board is provided with cooling/heating relay, low/high cooling relay, and low/high heating relay. Other HVAC systems comprise two heating stages and a single cooling stage, or a certain combination of the heating rotational speed and the cooling rotational speed.

The PSC has a reasonable efficiency when it runs at a high rotational speed, and the efficiency thereof decreases to below 20% when it runs at a low rotational speed. As the air conditioner evaporator coil necessitates a higher air flow than the stove heat exchanger, the motor of the blow operates at a relatively low rotational speed during the operation of the stove, thereby being poorly efficient. When the control board of the stove is provided with a special relay for controlling a continuous fan mode, the motor operates at a much lower rotational speed during the "ON" operating period of the continuous fan mode, the efficiency is the lowest.

Because the PSC motor has a low efficiency, most updated HVAC systems utilizes electronically-commutated motor (ECM), also called DC blushless permanent magnet synchronous motor. The power of the ECM motor is approximately proportional to the cube of the rotational speed, while the power of the PSC motor is approximately proportional to the rotational speed. Thus, when the rotational speed of the motor decreases, the power of the ECM motor is lower than the power of the PSC motor within the whole range of the rotational speed of the motor. This is very important when blower continuously operates.

It is desired that the ECM motor is directly used to substitute the present PSC motor without changing the original arrangement of wires and connection relationship of the original HVAC system, realizing the advantage of the ECM motor. The replacement is also advantageous in that the simple control circuit is used, thereby decreasing the complexity of the substituting system and eliminating additional arrangement of wires.

A typical ECM motor for substituting the PSC motor is shown in FIG. 2. The ECM motor includes a motor entity 1 and a motor controller 2. The motor entity 1 comprises: a stator assembly; a rotor assembly; a housing assembly, and 6 gear input lines L1, L2, L3, L4, L5, and L6. The motor controller 2 includes a control circuit board and a box. The motor controller 2 has a structure as shown in FIG. 3 and includes: a microprocessor, an inverter circuit, a gear detection circuit, an operating parameter detection unit, and a power supplier. The operating parameter detection unit detects a rotational speed signal of the rotor, a phase current signal, a phase voltage signal of the motor. The power supplier comprises a rectification circuit, a voltage stabilizing circuit, and a DC-DC conversion circuit. The gear detection circuit detects the energizing state of six gear input lines L1, L2, L3, L4, L5, and L6. Six rotational speeds (V11, V12, V13, V14, V15, and V16) are preset by the microprocessor in ascending order to corresponding to the six gear input lines L1, L2, L3, L4, L5, and L6. One or more (generally no more than four) of the six gear input lines are in an activated and efficient state, but only one rotational speed is selected via the logic relationship of the gear input line. The motor is controlled to operate at the six rotational speeds (V11, V12, V13, V14, V15, and V16) in a constant torque mode. Because the torque is proportional to the current, the control of the rotational speed of the motor is virtually converted into the control of the torque, that is, the control of the current. Six torque data (T11, T12, T13, T14, T15, and T16) corresponding to the six rotational speeds (V11, V12, V13, V14, V15, and V16) are stored by the microprocessor as the factory defaults of the motor.

However, because with the continuous change of the application environment of the motor, for example, the requirements of the static pressure and the power, the factory default of the set of the torque data corresponding to the six gear input lines are possibly not suitable to the environment, and the torque is required to be corrected for meeting the requirement of the application environment, thereby making the actual rotational speed be comparable with the expected rotational speed. A typical method for torque correction includes: operating the motor in the working field; allowing the motor to meet requirements of five rotational speed (V11, V12, V13, V14, and V15); recording actual measured torque data (T110, T120, T130, T140, and T150); and replacing the preset torque data (T11, T12, T13, T14, and T15) of the factory default with the actual measured torque data (T110, T120, T130, T140, and T150) for operating the motor.

The above torque correction method has the following disadvantages: 1) a narrow application range. Because a present PSC motor has two typical rated rotational speeds, one is a 1080 RPM motor having 6 poles, an actual rated rotational speed is between 1000 RPM and 1200 RPM; and the other is an 825 RPM motor, an actual rated rotational speed is between 800 RPM and 875 RPM. When six rotational speeds are designed as a set by the microprocessor, the highest rotational speed is 1075 RPM as disclosed by the prior arts. Therefore, the other four rotational speeds are designed between 600 RPM and 1075 RPM, the gap between every two rotational speeds is very large; besides, rotational speed below 600 RPM cannot be obtained in a continuous fan mode, the two rated rotational speeds are not met, thereby resulting in the low application range. 2) the torque is unable to be fine-tuned. Because only one set of actual measured torque data are stored in the microprocessor, when the external static pressure or the environment changes, no other set of actual measured torque data can be selected to adapt to the external environment, resulting in inaccurate control. In substituting the PSC motor, when the external static pressure is relatively high due to the accumulation of dust in the air channel, the steady torque of the motor in the mode of the constant rotational speed of 1075 RPM will be smaller than the standard steady torque provided by the manufacturer, and in normal operation of the motor, the actual torque will be relatively smaller, thereby resulting in a smaller air volume.

SUMMARY OF THE INVENTION

In view of the above-described problems, it is one objective of the invention to provide a method for automatically correcting torque for substituting a permanent-split capacitor (PSC) motor by an electronically-commutated motor (ECM). The method has a wide application, capability for automatic torque adjustment, and high control accuracy, and is much easier to acclimate to changes in external environment.

To achieve the above objective, in accordance with one embodiment of the invention, there is provided a method for automatically correcting torque for substituting a PSC motor by an ECM. The ECM motor comprises: a stator assembly; a rotor assembly; a housing assembly; a motor controller, the motor controller comprising a microprocessor, an inverter circuit, and a gear detection circuit; and a plurality of gear input lines for controlling a rotational speed of each gear. The gear detection circuit detects an energized condition signal of the gear input line and transmits the energized condition signal to the microprocessor; and the microprocessor selects a corresponding rotational speed according to the energized condition signal of the gear input line and controls the inverter circuit to drive the stator assembly. The method comprising the following steps:

1) presetting the rotational speed of each gear according to a common rotational speed of the substituted PSC motor by corresponding gear input lines (L1, L2, L3, L4, L5, and L6) of the microprocessor; providing a certain mechanism to select one corresponding rotational speed set from two sets of rotational speed in consideration that the substituted PSC motor has 6 poles or 8 poles in actual conditions, the two sets of rotational speed comprising a high gear set of rotational speed (V1, V2, V3, V4, V5, and V6) and a low gear set of rotational speed (V01, V02, V03, V04, V05, and V06); controlling a highest gear of the high gear set of rotational speed (V6) at between 900 RPM and 1200 RPM corresponding to a rated rotational speed of the PSC motor having 6 poles, controlling a highest gear of the low gear set of rotational speed (V06) at between 800 RPM and 900 RPM corresponding to a rated rotational speed of the PSC motor having 8 poles; and selecting N power points in ascending order within a range of the rated power of the motor, acquiring a set of torque data consisting of 6 output torques corresponding to the high gear set of rotational speed at each power point by calculation, acquiring a set of torque data consisting of 6 output torques corresponding to the low gear set of rotational speed at each power point by calculation, and storing a total 2×N sets of torque data by the microprocessor, in which, N sets of torque data belong to the high gear set of rotational speed, and the remaining N sets of torque data belong to the low gear set of rotational speed;

2) determining whether to enter the torque correction mode for operating the motor at the highest gear of the high gear set of rotational speed (V6) or at the highest gear of the low gear set of rotational speed (V06) according to the rated rotational speed on a nameplate of the substituted PSC motor;

3) selecting the high gear set of rotational speed to drive the motor to enter the torque correction mode when the rated rotational speed on the nameplate of the substituted PSC motor is between 900 RPM and 1200 RPM, and controlling the rotational speed at the highest gear of the high gear set of rotational speed (V6); selecting the low gear set of rotational speed to drive the motor to enter the torque correction mode when the rated rotational speed on the nameplate of the substituted PSC motor is between 800 RPM and 900 RPM, and controlling the rotational speed at the highest gear of the low gear set of rotational speed (V06); and recording a steady torque Tadj when the motor operates in a steady state; and 4) comparing the steady torque Tadj with a maximum gear torque Tmax of each set from the N high gear sets of rotational speed or from the N low gear sets of rotational speed; selecting the set of torque data to which T[M]max belongs when the steady torque Tadj satisfies $110\% \times T[M-1]max < Tadj \leq 110\% \times T[M]max$, $M=1, 2, \ldots, N$; when $M=1$, $T0max=0$; and after shifting the motor from the torque correction mode, using the selected set of torque data T[M] to operate the motor in a constant torque control mode when operating the motor in a common mode; wherein the rotational speed at the steady state is approximately equivalent to the rotational speed of each gear of the substituted PSC motor.

In a class of this embodiment, the high gear set of rotational speed comprises 6 gears of rotational speed (V1, V2, V3, V4, V5, and V6), in which, V6 is 1080 RPM, V5 is 975 RPM, V4 is 900 RPM, V3 is 825 RPM, V2 is 700 RPM, and V1 is 600 RPM. The low gear set of rotational speed comprises 6 gears of rotational speed (V01, V02, V03, V04, V05, and V06), in which, V06 is 825 RPM, V05 is 740 RPM, V04 is 700 RPM, V03 is 660 RPM, V02 is 600 RPM, and V01 is 550 RPM.

In a class of this embodiment, the 2×N sets of torque data are stored by the microprocessor in factory defaults. Once a set of torque data are selected, the set of torque data are corresponding to the gear input lines. The microprocessor is asked by the user by a certain mechanism, such as by means of a plurality of the gear input lines being simultaneously energized, to select the high gear set of rotational speed or the low gear set of rotational speed to enter the torque auto-correction mode.

In a class of this embodiment, the set of torque data comprising a maximum toque from the high gear sets of rotational speed are selected as the set of torque data for a default state of the motor operation when the motor is directly started without executing the torque auto-correction mode or when the microprocessor is asked via a certain mechanism to reset the preset torque to a factory default.

In a class of this embodiment, after a set of torque data T[M] are selected, each torque of T[M] is required to multiply a coefficient X for torque trimming when the selected set of torque data T[M] satisfy the condition that $T[M]max < Tadj \leq 110\% \times T[M]max$ and $M=1, 2, \ldots, N$; and the coefficient $X=Tadj/T[M]max$.

In a class of this embodiment, when the motor is driven to operate at the highest gear of the high gear set of rotational speed (V6), the rotational speed is reduced successively until reaching the steady state when the motor is unable to reach the steady state within a required time. When the motor is driven to operate at the highest gear of the low gear set of rotational speed (V06), the rotational speed is increased successively until reaching the steady state when the motor is unable to reach the steady state within a required time, and the steady torque Tadj is recorded.

In a class of another embodiment of the invention, there is provided another method for automatically correcting torque for substituting a PSC motor by an ECM motor. The ECM motor comprises: a stator assembly; a rotor assembly; a housing assembly; a motor controller, the motor controller comprising a microprocessor, an inverter circuit, and a gear detection circuit; and a plurality of gear input lines for controlling a rotational speed of each gear. The gear detection circuit detects an energized condition signal of the gear input line and transmits the energized condition signal to the microprocessor; and the microprocessor selects a corresponding rotational speed according to the energized condition signal of the gear input line and controls the inverter circuit to drive the stator assembly. The method comprising the following steps:

1) presetting the rotational speed of each gear according to a common rotational speed of the substituted PSC motor by corresponding gear input lines (L1, L2, L3, L4, L5, and L6) of the microprocessor; providing a certain mechanism to select one corresponding rotational speed set from two sets of rotational speed in consideration that the substituted PSC motor has 6 poles or 8 poles in actual conditions, the two sets of rotational speed comprising a high gear set of rotational speed (V1, V2, V3, V4, V5, and V6) and a low gear set of rotational speed (V01, V02, V03, V04, V05, and V06); controlling a highest gear of the high gear set of rotational speed (V6) at between 900 RPM and 1200 RPM corresponding to a rated rotational speed of the PSC motor having 6 poles, controlling a highest gear of the low gear set of rotational speed (V06) at between 800 RPM and 900 RPM corresponding to a rated rotational speed of the PSC motor having 8 poles; and selecting N power points in ascending order within a range of the rated power of the motor, acquiring a set of torque data consisting of 6 output torques corresponding to the high gear set of rotational speed at each power point by calculation, acquiring a set of torque data consisting of 6 output torques corresponding to the low gear set of rotational speed at each power point by calculation, and storing a total 2×N sets of torque data by the microprocessor, in which, N sets of torque data belong to the high gear set of rotational speed, and the remaining N sets of torque data belong to the low gear set of rotational speed;

2) controlling the motor to enter an auto-correction mode by a certain mechanism, such as simultaneously energizing of a plurality of gear input lines or manually jumping wires, when the rated rotational speed of the motor on the nameplate of the substituted PSC motor is unclear and the actual data of the rated rotational speed is unknown, or when the installer wants to utilizes a much simplified method;

3) controlling the motor to operate at the highest gear of the high gear set of rotational speed (V6) by the microprocessor of the motor controller, recording a steady torque Tadj1 when the motor reaches a steady state; comparing the steady torque Tadj1 with a maximum gear torque Tmax of each of the N sets of torque data belonging to the high gear set of rotation speed, respectively; selecting the rotational speeds of the gear input lines corresponding to the set of torque data comprising $T[M]max$ when the steady torque Tadj1 satisfies $110\% \times T[M-1]max < Tadj1 \leq 110\% \times T[M]max$, $M=1, 2, \ldots, N$; when $M=1$, $T0max=0$;

4) controlling the motor to operate at the highest gear of the low gear set of rotational speed (V06) by the microprocessor of the motor controller when step 3) is timeout and the motor is unable to reach the steady state or when the steady torque $Tadj1 > min (110\% \times T[N]max, Tmax-o)$, in which, min (A, B) is a function when both the minimum values of A and B are selected, and Tmax-o represents a maximum torque of the ECM motor, and recording a steady torque Tadj2 when the motor reaches a steady state; comparing the steady torque Tadj2 with a maximum gear torque Tmax of each of the N sets of torque data belonging to the low gear set of rotational speed, respectively; and selecting the rotational speeds of the gear input lines corresponding to the set of torque data comprising $T[M]max$ when the steady torque Tadj2 satisfies $110\% \times T[M-1]max < Tadj2 \leq 110\% \times T[M]max$, $M=1, 2, \ldots, N$; when $M=1$, $T0max=0$;

5) selecting the rotational speeds of the gear input lines corresponding to the set of torque data comprising $T[N]max$ of the N sets of torque data belonging to the low gear set of rotational speed when the step 4) is timeout and the motor is unable to reach the steady state or when the steady torque $Tadj2 > min (110\% \times T[N]max, Tmax-o)$; and 6) shifting the motor from the torque correction mode after the torque value being selected according to step 5); and replacing the motor with another one having a higher horsepower when an actual measured air volume is too low when operating the motor at the highest gear V6 or V06 in a normal mode.

In a class of this embodiment, the high gear set of rotational speed comprises 6 gears of rotational speed (V1, V2, V3, V4, V5, and V6), in which, V6 is 1080 RPM, V5 is 975 RPM, V4 is 900 RPM, V3 is 825 RPM, V2 is 700 RPM, and V1 is 600 RPM. The low gear set of rotational speed comprises 6 gears of rotational speed (V01, V02, V03, V04, V05, and V06), in which, V06 is 825 RPM, V05 is 740 RPM, V04 is 700 RPM, V03 is 660 RPM, V02 is 600 RPM, and V01 is 550 RPM.

In a class of this embodiment, the set of torque data comprising a maximum toque from the high gear sets of rotational speed are selected as the set of torque data for a default state of the motor operation when the motor is directly started without executing the torque auto-correction mode or when the microprocessor is asked via a certain mechanism to reset the preset torque to a factory default.

In a class of this embodiment, after a set of torque data $T[M]$ are selected, each torque of $T[M]$ is required to multiply a coefficient X for torque trimming when the selected set of torque data $T[M]$ satisfy the condition that $T[M]max < Tadj \leq 110\% \times T[M]max$ and $M=1, 2, \ldots, N$, and the coefficient $X=Tadj1/T[M]max$. Each of the torque of $T[M]$ is required to multiply a coefficient X for torque trimming when the selected set of torque data $T[M]$ satisfy the condition that $T[M]max < Tadj2 \leq 110\% \times T[M]max$ and $M=1, 2, \ldots, N$, and the coefficient $X=Tadj2/T[M]max$.

Compared with the prior art, advantages of the invention are summarized as follows:

1) The rotational speed of each gear is preset by corresponding gear input lines (L1, L2, L3, L4, L5, and L6) of the microprocessor. One corresponding rotational speed set is selected from two sets of rotational speed via a certain mechanism (such as the gear input lines for controlling the rotational speed of the gear being simultaneously energized). The two sets of rotational speed comprise the high gear set of rotational speed (V1, V2, V3, V4, V5, and V6) and the low gear set of rotational speed (V01, V02, V03, V04, V05, and V06). The highest gear of the high gear set of rotational speed (V6) is controlled at between 1080 RPM corresponding to the rated rotational speed of the PSC motor having 6 poles. The highest gear of the low gear set of rotational speed (V06) is controlled at between 825 RPM corresponding to the rated rotational speed of the PSC motor having 8 poles. N power points are selected in ascending order within a range of the rated power of the motor, and a set of torque data consisting of 6 output torques are obtained corresponding to the high gear set of rotational speed at each power point by calculation, and a set of torque data consisting of 6 output torques are obtained corresponding to the low gear set of rotational speed at each power point by calculation. The total 2×N sets of torque data (a total 6×2×N torque data) are stored by the microprocessor; thereby meeting the requirements for substituting PSC motors in the market that have a rated rotational speed in a range of 800 RPM and 900 RPM or in a range of 900 RPM and 1200 RPM, the method has a wide application, and the adjustment of the motor using the method is much convenient.

2) The highest gear of the high gear set of rotational speed is selected to drive the motor to enter the torque correction mode when the rated rotational speed on the nameplate of the substituted PSC motor is between 900 RPM and 1200 RPM, and the rotational speed is controlled at 1080 RPM. The lowest gear of the low gear set of rotational speed is selected to drive the motor to enter the torque correction mode when the rated rotational speed on the nameplate of the substituted PSC motor is between 800 RPM and 900 RPM, the rotational speed is controlled at 825 RPM, and the steady torque $T_{adj}$ is recorded when the motor operates in a steady state. The steady torque $T_{adj}$ is compared with the maximum gear torque $T_{max}$ of each set from the N high gear sets of rotational speed or from the N low gear sets of rotational speed. The set of torque data to which $T[M]max$ belongs is selected when the steady torque $T_{adj}$ satisfies $110\% \times T[M-1]max < T_{adj} \leq 110\% \times T[M]max$, $M=1, 2, \ldots, N$. After the motor is shifted from the torque correction mode, the selected set of torque data $T[M]$ are used to operate the motor in a constant torque control mode when operating the motor in a common mode, and the rotational speed at the steady state is approximately equivalent to the rotational speed of each gear of the substituted PSC motor. Thus, the ECM motor satisfies the requirement of PSC motors of different powers, for example, an ECM motor having a power of ½ horsepower is capable of substituting a PSC motor having a rated rotational speed of 825 RPM and a power of ⅓ horsepower, or a PSC motor having a rated rotational speed of 1080 RPM and a power of ¼ horsepower, because that a proper set of torque data corresponding to different gear input lines and different gears are selected to operate the motor, the fine-tune ability is very powerful, and the adaptability is wide. The rated power of the ECM motor is required to be higher or equal to the rated power of the substituted PSC motor, and the rated torque of the PSC motor at the rated power is required to not exceed the maximum torque of the ECM. Besides, several sets of torque data are selectable, thereby having higher control accuracy.

3) The control logic in the known prior arts is that the working torque is determined by the steady torque when the rotational speed is controlled at 1075 RPM, which results in several problems. Because when the pipeline is dirty and obstructed, the external static pressure of the blower is higher than the standard value provided by the manufacturer. The steady torque becomes small at the constant rotational speed, resulting in a relatively small working torque in a normal working mode and a relatively small air volume. Thus, the ECM motor using such control logic to blast approximately conforms to the regular pattern of the PSC motor (the air volume largely decreases with the increase of the external static pressure) but does not fully utilize the high flexibility of ECM motor to maintain the air volume. The control method of the invention utilizes the presetting torque data to ensure a proper set of torque data be selected within a relatively large range even the pipeline is dirty and obstructed or the static pressure is relatively large and the steady torque decreases at the constant rotational speed. A relatively low set of torque data may be selected due to too large of the external static pressure. Whichever the torque data are selected, the torques selected using the method of the invention are larger or equal to those using the method conforming with that the working torque is directly determined by the steady rotational speed. In most conditions, the method of the invention is equivalent to using the torque value at the standard static pressure provided by the manufacturer for constant torque control, thereby having a prominent effect for maintaining the air volume.

4) After a set of the torque data $T[M]$ are selected, each torque of $T[M]$ is required to multiply the coefficient X for torque trimming when the selected set of torque data $T[M]$ satisfy the condition that $T[M]max < T_{adj} \leq 110\% \times T[M]max$ and $M=1, 2, \ldots, N$; and the coefficient $X = T_{adj}/T[M]max$. Thus, the selected set of torque data are fine-tuned, and the control accuracy is improved. The purpose for the torque trimming is that during the process of torque correction, when the steady torque at the constant rotational speed is too low because the external static pressure is too high, a relative low set of torque data is required. The coefficient for fine-tuning ensures a normal operation of the motor as well as that the actual output torque is equal to rather than smaller than the steady torque during the torque correction.

5) When the motor is driven to operate at the 1080 RPM of the high gear set of rotational speed, the rotational speed is reduced successively (such as 30 RPM for each time) until reaching the steady state when the motor is unable to reach the steady state within a required time. When the motor is driven to operate at 825 RPM of the low gear set of rotational speed, the rotational speed is increased successively (such as 30 RPM for each time) until reaching the steady state when the motor is unable to reach the steady state within a required time, and the steady torque $T_{adj}$ is recorded. Thus, the process of the torque correction is prevented from the endless loop.

6) When the rated rotational speed of the motor on the nameplate of the substituted PSC motor is unclear and the actual data of the rated rotational speed is unknown, or when the installer wants to utilizes a much simplified method, a certain mechanism, such as simultaneously energizing of a plurality of gear input lines or manually jumping wires, to enter the automatic torque correction mode. Thus, the automation degree is high, and the installation steps are simplified.

DETAILED DESCRIPTION OF THE EMBODIMENTS

For further illustrating the invention, experiments detailing a method for automatically correcting torque for substituting a PSC motor by an ECM motor are described hereinbelow combined with the drawings.

Figure 1:
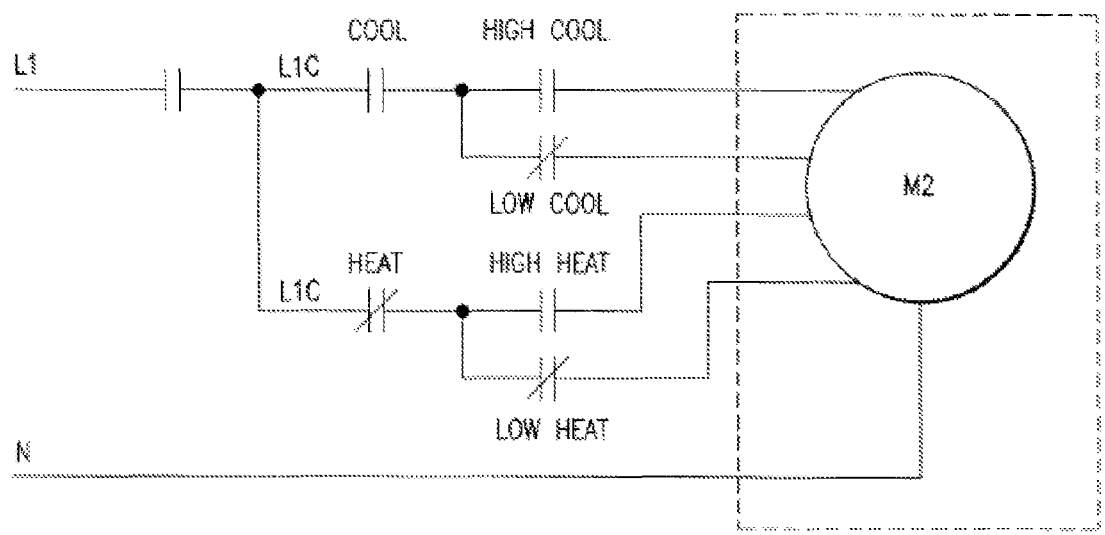
FIG. 1 is a wiring diagram of a PSC motor of a typical air conditioner system.
Figure 2:
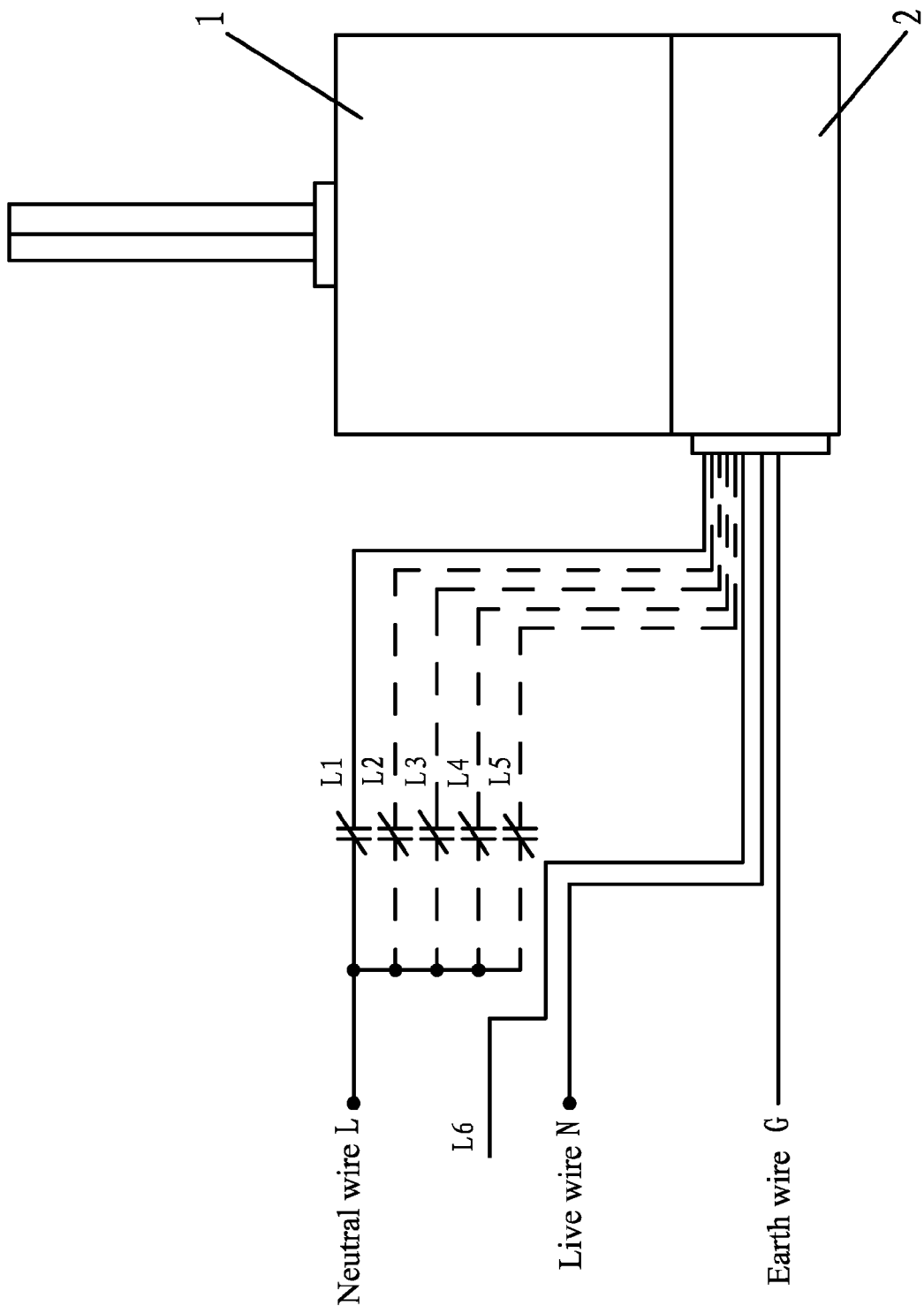
FIG. 2 is a structure diagram of an ECM motor for substituting a PSC motor.
Figure 3:
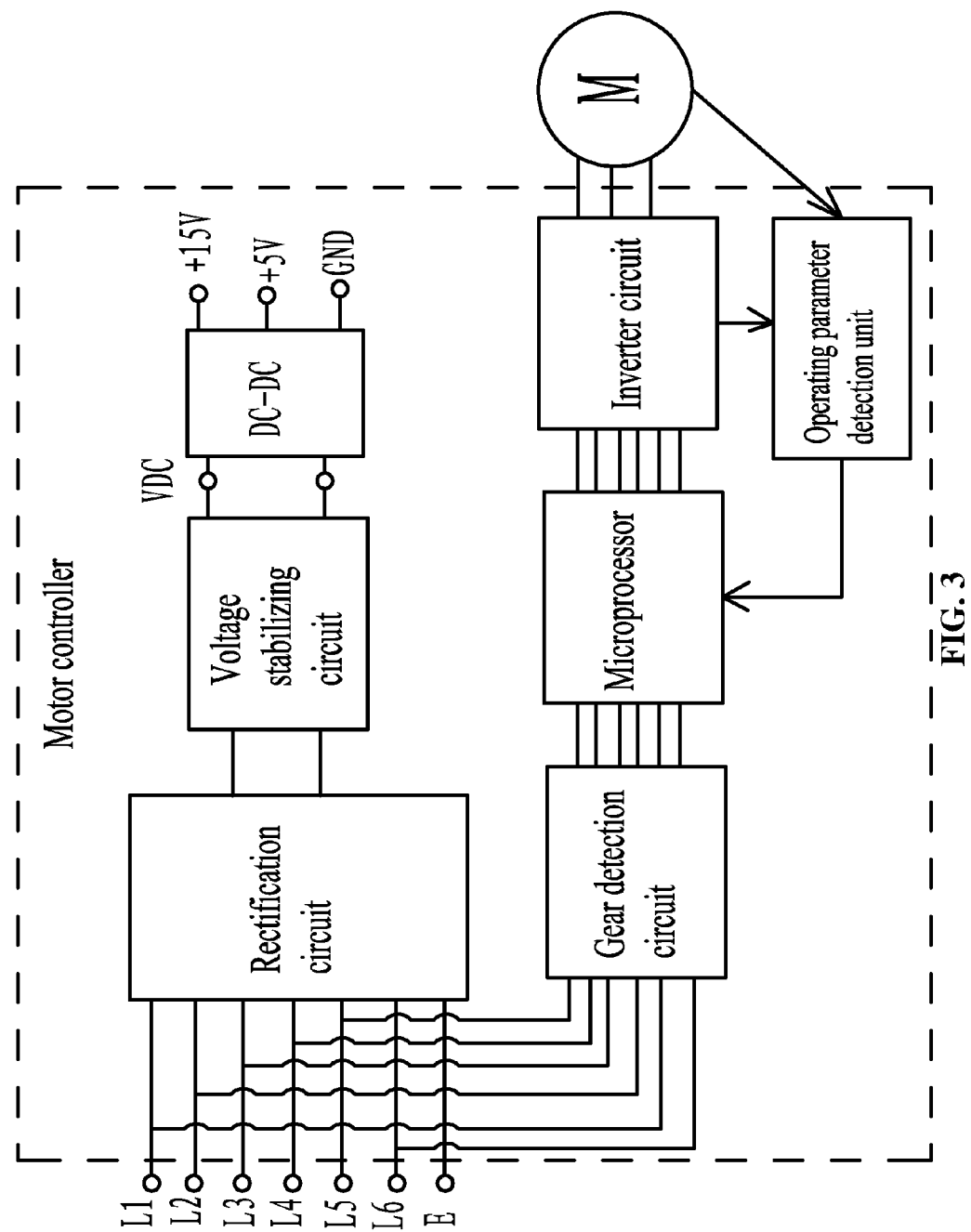
FIG. 3 is a circuit block diagram of a controller of an ECM motor for substituting a PSC motor.
Figure 4:
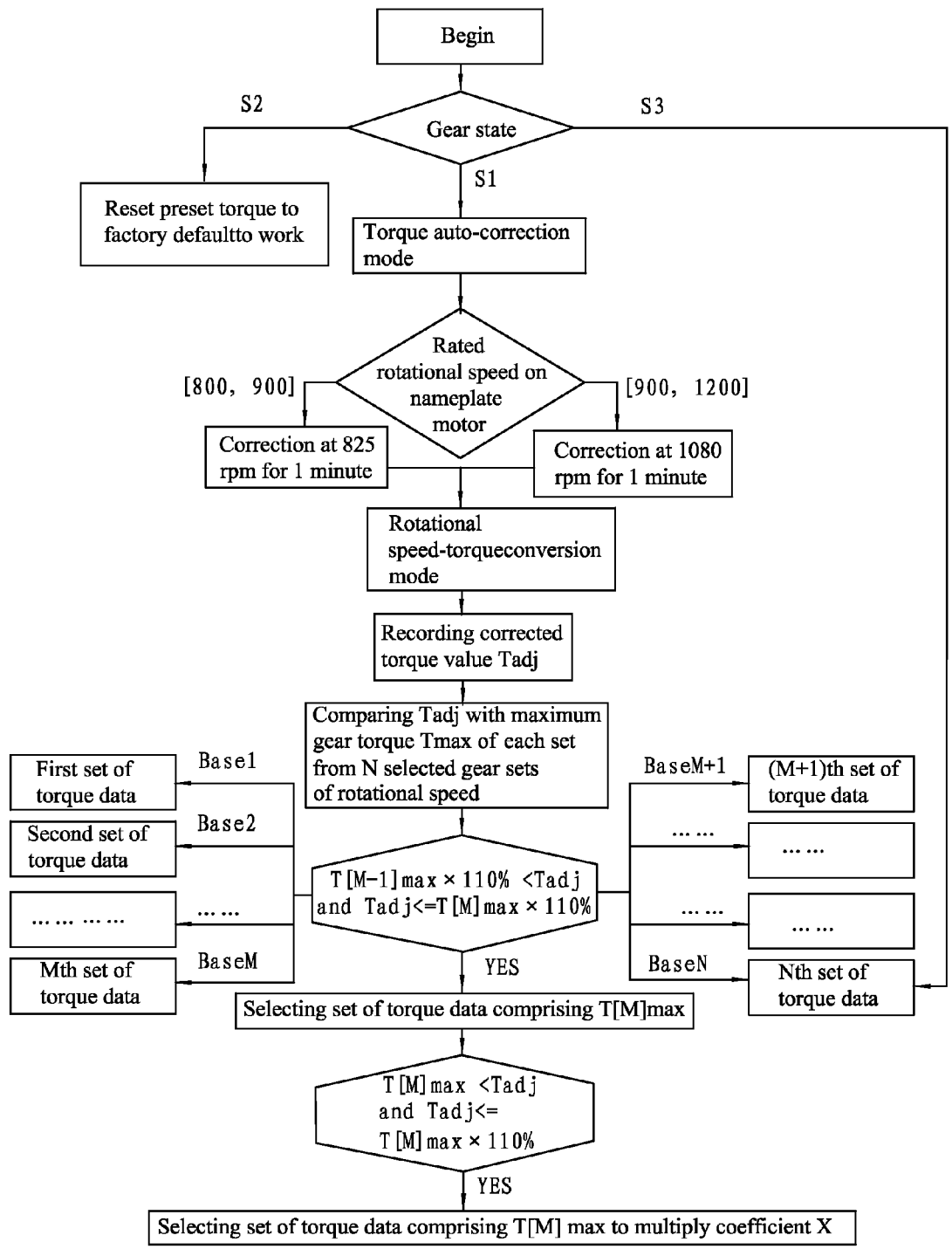
FIG. 4 is a control flow diagram of a method for automatically correcting torque for substituting a PSC motor by an ECM motor of the invention.

As shown in FIGS. 2-4, a method for a method for automatically correcting torque for substituting a PSC motor by an ECM motor. The rated power of the ECM motor is larger than or equal to the rated power of the PSC motor. The ECM motor comprises a motor entity 1 and a motor controller 2. The motor entity 1 comprises: a stator assembly; a rotor assembly; a housing assembly, and 6 gear input lines L1, L2, L3, L4, L5, and L6. The motor controller 2 comprises a control circuit board and a box. The motor controller 2 has a structure as shown in FIG. 3 and comprises: a microprocessor, an inverter circuit, a gear detection circuit, an operating parameter detection unit, and a power supplier. The operating parameter detection unit detects a rotational speed signal of the rotor, a phase current signal, a phase voltage signal of the motor. The power supplier comprises a rectification circuit, a voltage stabilizing circuit, and a DC-DC conversion circuit. The gear detection circuit detects energized condition signals of the 6 gear input lines L1, L2, L3, L4, L5, and L6 and transmits the energized condition signals to the microprocessor; and the microprocessor selects a corresponding rotational speed according to the energized condition signal of the gear input line and controls the inverter circuit to drive the stator assembly. The method comprising the following steps:

1) presetting the rotational speed of each gear according to a common rotational speed of the substituted PSC motor by corresponding gear input lines (L1, L2, L3, L4, L5, and L6) of the microprocessor; providing a certain mechanism to select one corresponding rotational speed set from two sets of rotational speed in consideration that the substituted PSC motor has 6 poles or 8 poles in actual conditions, the two sets of rotational speed comprising a high gear set of rotational speed (V1, V2, V3, V4, V5, and V6) and a low gear set of rotational speed (V01, V02, V03, V04, V05, and V06); controlling a highest gear of the high gear set of rotational speed (V6) at between 900 RPM and 1200 RPM corresponding to a rated rotational speed of the PSC motor having 6 poles, controlling a highest gear of the low gear set of rotational speed (V06) at between 800 RPM and 900 RPM corresponding to a rated rotational speed of the PSC motor having 8 poles; and selecting N power points in ascending order within a range of the rated power of the motor, acquiring a set of torque data consisting of 6 output torques corresponding to the high gear set of rotational speed at each power point by calculation, acquiring a set of torque data consisting of 6 output torques corresponding to the low gear set of rotational speed at each power point by calculation, and storing a total 2×N sets of torque data by the microprocessor, in which, N sets of torque data belong to the high gear set of rotational speed, and the remaining N sets of torque data belong to the low gear set of rotational speed;

2) determining whether to enter the torque correction mode for operating the motor at the highest gear of the high gear set of rotational speed (V6) or at the highest gear of the low gear set of rotational speed (V06) according to the rated rotational speed on a nameplate of the substituted PSC motor;

3) selecting the high gear set of rotational speed to drive the motor to enter the torque correction mode when the rated rotational speed on the nameplate of the substituted PSC motor is between 900 RPM and 1200 RPM, and controlling the rotational speed at the highest gear of the high gear set of rotational speed (V6); selecting the low gear set of rotational speed to drive the motor to enter the torque correction mode when the rated rotational speed on the nameplate of the substituted PSC motor is between 800 RPM and 900 RPM, and controlling the rotational speed at the highest gear of the low gear set of rotational speed (V06); and recording a steady torque Tadj when the motor operates in a steady state; and 4) comparing the steady torque Tadj with a maximum gear torque Tmax of each set from the N high gear sets of rotational speed or from the N low gear sets of rotational speed; selecting the set of torque data to which T[M]max belongs when the steady torque Tadj satisfies 110%×T[M−1]max<Tadj≤110%×T[M]max, M=1, 2, . . . , N; and after shifting the motor from the torque correction mode, using the selected set of torque data T[M] to operate the motor in a constant torque control mode when operating the motor in a common mode; wherein the rotational speed at the steady state is approximately equivalent to the rotational speed of each gear of the substituted PSC motor.

The high gear set of rotational speed comprises 6 gears of rotational speed (V1, V2, V3, V4, V5, and V6), in which, V6 is 1080 RPM, V5 is 975 RPM, V4 is 900 RPM, V3 is 825 RPM, V2 is 700 RPM, and V1 is 600 RPM. The low gear set of rotational speed comprises 6 gears of rotational speed (V01, V02, V03, V04, V05, and V06), in which, V06 is 825 RPM, V05 is 740 RPM, V04 is 700 RPM, V03 is 660 RPM, V02 is 600 RPM, and V01 is 550 RPM. These sets of the rotational speed are approximately equivalent to the gear of the rotational speed of the PSC motor in the market.

The 2×N sets of torque data are stored by the microprocessor in factory defaults. The microprocessor is asked by the user by a certain mechanism, such as by means of a plurality of the gear input lines being simultaneously energized (the setting of the gear state is as shown in FIG. 4), to select a set of torque data corresponding to the rotational speeds of the gear input lines, respectively.

The set of torque data comprising a maximum toque from the high gear sets of rotational speed are selected as the set of torque data for a default state of the motor operation when the motor is directly started without executing the torque auto-correction mode.

After a set of torque data T[M] are selected, each torque of T[M] is required to multiply a coefficient X for torque trimming when the selected set of torque data T[M] satisfy the condition that T[M]max<Tadj≤110%×T[M]max and M=1, 2, . . . , N; and the coefficient X=Tadj/T[M]max.

When the motor is driven to operate at the highest gear of the high gear set of rotational speed (V6), the rotational speed is reduced successively until reaching the steady state when the motor is unable to reach the steady state within a required time. When the motor is driven to operate at the highest gear of the low gear set of rotational speed (V06), the rotational speed is increased successively until reaching the steady state when the motor is unable to reach the steady state within a required time, and the steady torque Tadj is recorded.

Example 1

An ECM motor is selected to substitute a PSC motor, the ECM motor has a rated motor of ½ Hp. The rated power of the ECM motor is larger than or equal to the rated power of the PSC motor. The ECM motor is provided with 6 rotational speeds and 6 torque values as factory defaults corresponding to 6 gear input lines (L1, L2, L3, L4, L5, and L6). The 6 torque values are a default set of torque data from the factory, as shown in Table 1.

TABLE 1

|  | Gear input lines | | | | | |
| --- | --- | --- | --- | --- | --- | --- |
|  | L6 | L5 | L4 | L3 | L2 | L1 |
| Rotational speed of each gear (RPM) | 1080 | 975 | 900 | 825 | 700 | 600 |
| Torque (oz-ft) | 38.9 | 31.7 | 27.0 | 22.7 | 16.3 | 12.0 |

When the 6 gear input lines L1, L2, L3, L4, L5, and L6 are simultaneously energized with 24 VAC or line voltage; the signals of the gear state arrangement are received by the microprocessor; and the set of the torque data (as shown in Table 1) are recovered to the factory defaults and the motor operates with the default torque data. 2×N sets of torque data are stored by the microprocessor of the ECM motor, in which, N is the number of the rated power of the PSC motor covered, taken the ½ HP ECM motor as an example, power sections of ⅕ HP, ¼HP, ⅓HP, and ½HP of the PSC motors are covered, and thus, N=4. The gear input lines of the microprocessor are preset with rotational speed of each gear, and one corresponding rotational speed set is selected from two sets of rotational speed. The two sets of rotational speed comprise a high gear set of rotational speed (V1, V2, V3, V4, V5, and V6) and a low gear set of rotational speed (V01, V02, V03, V04, V05, and V06). That is, the 6 gear input lines L1, L2, L3, L4, L5, and L6 are corresponding to the high gear set of rotational speed (V1, V2, V3, V4, V5, and V6) or the low gear set of rotational speed (V01, V02, V03, V04, V05, and V06) via a certain mechanism. A highest gear of the high gear set of rotational speed (V6) is controlled at 1080 RPM, and a highest gear of the low gear set of rotational speed (V06) is controlled at 825 RPM. N power points are selected in ascending order within a range of the rated power of the motor (for example N=4 power points as described above). 4 sets of torque data with each set consisting of 6 output torques corresponding to the high gear set of rotational speed at each power point are obtained by calculation. 4 sets of torque data with each set consisting of 6 output torques corresponding to the low gear set of rotational speed at each power point are obtained by calculation. Each set of torque data are stored by the microprocessor. The high gear set of rotational speed comprises 6 gears of rotational speed (V1, V2, V3, V4, V5, and V6), in which, V6 is 1080 RPM, V5 is 975 RPM, V4 is 900 RPM, V3 is 825 RPM, V2 is 700 RPM, and V1 is 600 RPM. The low gear set of rotational speed comprises 6 gears of rotational speed (V01, V02, V03, V04, V05, and V06), in which, V06 is 825 RPM, V05 is 740 RPM, V04 is 700 RPM, V03 is 660 RPM, V02 is 600 RPM, and V01 is 550 RPM. These data are approximately equivalent to the rotational speed of gears of the PSC motor in the market, as shown in Tables 2-3.

TABLE 2

| Gear input line | High gear set of rotational speed (RPM) | First set of torque data (oz-ft) | Second set of torque data (oz-ft) | Third set of torque data (oz-ft) | Fourth set of torque data (oz-ft) |
| --- | --- | --- | --- | --- | --- |
| L6 | 1080 | 15.6 | 19.5 | 25.9 | 38.9 |
| L5 | 975 | 12.7 | 15.9 | 21.1 | 31.7 |
| L4 | 900 | 10.8 | 13.5 | 18.0 | 27.0 |
| L3 | 825 | 9.1 | 11.4 | 15.1 | 22.7 |
| L2 | 700 | 6.5 | 8.2 | 10.9 | 16.3 |
| L1 | 600 | 4.8 | 6.0 | 8.0 | 12.0 |
| Corresponding rated power | | ⅕ HP | ¼ HP | ⅓ HP | ½ HP |

TABLE 3

| Gear input line | Low gear set of rotational speed (RPM) | Fifth set of torque data (oz-ft) | Sixth set of torque data (oz-ft) | Seventh set of torque data (oz-ft) | Eighth set of torque data (oz-ft) |
| --- | --- | --- | --- | --- | --- |
| L6 | 825 | 20.4 | 25.5 | 33.9 | 42 |
| L5 | 740 | 16.4 | 20.5 | 27.3 | 41.0 |
| L4 | 700 | 14.7 | 18.3 | 24.4 | 36.7 |
| L3 | 660 | 13.0 | 16.3 | 21.7 | 32.6 |
| L2 | 600 | 10.8 | 13.5 | 17.9 | 26.9 |
| L1 | 550 | 9.1 | 11.3 | 15.1 | 22.6 |
| Corresponding rated power | | ⅕ HP | ⅕ HP | ¼ HP | ⅓ HP |

When using the ECM motor to substitute the PSC motor, the motor is required to enter the automatic torque correction mode to select the correct torque so as to output rotational speed approximately equivalent to the PSC motor during the operation of the ECM motor. The set of rotational speed is determined according to the rated rotational speed on the nameplate of the substituted PSC motor before the entering of the torque correction mode. The highest gear of the high gear set of rotational speed V6=1080 RPM is selected to drive the motor to enter the torque correction mode when the rated rotational speed on the nameplate of the substituted PSC motor is between 900 RPM and 1200 RPM (via a certain mechanism, such as, simultaneously energizing the gear input lines L6, L5, L4, L3, L2, and L1, sending an order to the microprocessor, and controlling the motor to operate at the rotational speed of 1080 RPM by the microprocessor; such mechanism will not conflict with the energizing logic in the normal operation of the motor). The highest gear of the low gear set of rotational speed V06=825 RPM is selected to drive the motor to enter the torque correction mode when the rated rotational speed on the nameplate of the substituted PSC motor is between 800 RPM and 900 RPM (via a certain mechanism, such as, simultaneously energizing the gear input lines L6, L5, L4, L3, L2, and L1, sending an order to the microprocessor, and controlling the motor to operate at the rotational speed of 825 RPM by the microprocessor; such mechanism will not conflict with the energizing logic in the normal operation of the motor). The steady torque Tadj is recorded when the motor reaches the steady state. The steady torque Tadj is compared with a maximum gear torque Tmax corresponding to the highest gear of each gear set of rotational speed. The set of torque data to which T[M]max belongs is selected when the steady torque Tadj satisfies 110%×T[M−1]max<Tadj≤110%×T[M]max, M=1, 2, 3, 4. The set of torque data to which T[M] max belongs is selected when T0max=0. After the motor is shifted from the torque correction mode, a selected set of torque data T[M] is used to operate the motor in a constant torque control mode when operating the motor in a common mode. The rotational speed at the steady state is approximately equivalent to the rotational speed of each gear of the substituted PSC motor.

For example, ¼ HP and 810 RPM are indicated on the nameplate of a PSC motor to be substituted, a ½ HP ECM motor is capable of replacing the PSC motor. Gear input lines L6, L5, L4, L3, L2, and L1 are simultaneously energized; the motor is driven by the microprocessor to select the low gear set of rotational speed to enter the automatic torque correction mode after the microprocessor receiving the order. The rotational speed of the motor is automatically controlled at 825 RPM, and a steady torque is calculated, for example, the steady torque Tadj=25.7 oz-ft (the air channel is clean and the external static pressure is relatively small). Thereafter, the fifth to the eighth torque data belonging to the low gear sets of rotational speed are detected by the program of the microprocessor, and the maximum torque values Tmax corresponding to the highest gear of the 4 low gear sets of rotational speed are 20.4, 25.5, 33.9, and 42, respectively. The maximum torque values Tmax of 25.5 corresponding to the highest gear of the sixth torque data is required to satisfy condition that 25.7<=110%×T[2]max=25.5×110%. Thus, the sixth set of torque data (M=2) are selected by the microprocessor to start the motor corresponding to the gear input lines L6, L5, L4, L3, L2, and L1. In order to improve the control accuracy, each of the torque of the sixth set of torque data is required to multiply a coefficient X for torque trimming, and the coefficient X=Tadj/T[2]max=25.7/25.5=1.0078.

When the air channel is dirty, the static pressure is relative large than that when the air channel is clean; the steady torque Tadj will decrease during the operation of the ECM motor in a constant rotational speed mode. In the above example, the external static pressure is relatively high resulting from a middle level-dirty air channel. Presuming the steady torque Tadj is 24.1 oz-ft, as the steady torque Tadj exceeds the maximum torque 110%×T[1]max=20.4×110%=22.4 corresponding to the highest gear of the fifth set of torque data but does not exceed the six set of torque data 110%×T[2]max, therefore, the sixth set of torque data are selected. Compared with the PSC motor, the air volume of the ECM motor in actual operation is prevented from decreasing by a large range when the static pressure is relatively large.

When the air channel is very dirty, the external static pressure of the blower is much larger than the above example, and the steady torque Tadj is further decreased. Providing that the steady torque Tadj is 21 oz-ft, within the range of the maximum torque T[1]max corresponding to the highest gear o the fifth set of torque data, thus, the fifth set of torque data are selected for operating the ECM motor. Each torque of the fifth set of torque data is required to multiply the coefficient X for torque trimming, and the coefficient X=Tadj/T[1]max=21/20.4=1.0294.

When the torque correction is finished, the motor is stopped from running, thereby reminding the user to disconnect the connection and to use the normal way to connect again.

A practical problem to be solved is that: in some conditions of a constant rotational speed mode, for example, at 825 RPM+ of high static pressure, or 1080 RPM+ of low static pressure, the motor is unable to reach the steady state. Thus, a default timeout limit is required to be designed in the drive program of the microprocessor. When the motor does not reach the steady state within the limited time, rotational speed is automatically increased by 30 RPM on the bases of the 825 RPM mode, when the motor is still unable to reach the steady state at the new rotational speed, the rotational speed is automatically increased by another 30 RPM, the above steps are repeated until the motor reaches the steady state, and a set of torque data are selected based on the above logical relationship. In the 1080 RPM mode, when the motor does not enter the steady state within the limited time, the rotational speed is correspondingly decreased by 30 RPM for each time until the motor reaches the steady state, and the steady torque Tadj is obtained.

The microprocessor is asked to recover the set of torque data in the default state to operate the motor via a certain mechanism (such mechanism does not conflict with the energizing logic in the normal operation of the motor), such as, simultaneously energizing the gear input lines L6, L5, L4, L3, L2, and L1; and the set of torque data in the default state is the fourth set of torque data in the above 8 sets of torque data.

Example 2

An ECM motor is selected to substitute a PSC motor, the ECM motor has a rated motor of 1 Hp. The ECM motor is provided with 6 rotational speeds and 6 torque values as factory defaults corresponding to 6 gear input lines (L1, L2, L3, L4, L5, and L6). The 6 torque values are a default set of torque data from the factory, as shown in Table 4.

TABLE 4

| | Gear input lines | | | | | |
|---|---|---|---|---|---|---|
| | L6 | L5 | L4 | L3 | L2 | L1 |
| Rotational speed of each gear (RPM) | 1080 | 975 | 900 | 825 | 700 | 600 |
| Torque (oz-ft) | 77.8 | 63.4 | 54.0 | 45.4 | 32.7 | 24.0 |

When the 6 gear input lines L1, L2, L3, L4, L5, and L6 are simultaneously energized with 24 VAC or line voltage; the signals of the gear state arrangement are received by the microprocessor; and the set of the torque data (as shown in Table 4) are recovered to the factory defaults for operating the motor.

2×N sets of torque data are stored by the microprocessor of the ECM motor, in which, N is the number of the rated power of the PSC motor covered, taken the ½ HP ECM motor as an example, power sections of ½ HP, ¾ HP, 1 HP of the PSC motors are covered, and thus, N=3. The gear input lines of the microprocessor are preset with rotational speed of each gear, and one corresponding rotational speed set is selected from two sets of rotational speed. The two sets of rotational speed comprise a high gear set of rotational speed (V1, V2, V3, V4, V5, and V6) and a low gear set of rotational speed (V01, V02, V03, V04, V05, and V06). That is, the 6 gear input lines L1, L2, L3, L4, L5, and L6 are corresponding to the high gear set of rotational speed (V1, V2, V3, V4, V5, and V6) or the low gear set of rotational speed (V01, V02, V03, V04, V05, and V06) via a certain mechanism. A highest gear of the high gear set of rotational speed (V6) is controlled at 1080 RPM, and a highest gear of the low gear set of rotational speed (V06) is controlled at 825 RPM.N power points are selected in ascending order within a range of the rated power of the motor (for example N=3 power points as described above). 3 sets of torque data with each set consisting of 6 output torques corresponding to the high gear set of rotational speed at each power point are obtained by calculation. 3 sets of torque data with each set consisting of 6 output torques corresponding to the low gear set of rotational speed at each power point are obtained by calculation. Each set of torque data are stored by the microprocessor. The high gear set of rotational speed comprises 6 gears of rotational speed (V1, V2, V3, V4, V5, and V6), in which, V6 is 1080 RPM, V5 is 975 RPM, V4 is 900 RPM, V3 is 825 RPM, V2 is 700 RPM, and V1 is 600 RPM. The low gear set of rotational speed comprises 6 gears of rotational speed (V01, V02, V03, V04, V05, and V06), in which, V06 is 825 RPM, V05 is 740 RPM, V04 is 700 RPM, V03 is 660 RPM, V02 is 600 RPM, and V01 is 550 RPM. These data are approximately equivalent to the rotational speed of gears of the PSC motor in the market, as shown in Tables 5-6.

TABLE 5

| Gear input line | High gear set of rotational speed (RPM) | First set of torque data (oz-ft) | Second set of torque data (oz-ft) | Third set of torque data (oz-ft) |
|---|---|---|---|---|
| L6 | 1080 | 38.9 | 58.4 | 77.8 |
| L5 | 975 | 31.7 | 47.6 | 63.4 |
| L4 | 900 | 27.0 | 40.5 | 54.0 |
| L3 | 825 | 22.7 | 34.1 | 45.4 |
| L2 | 700 | 16.3 | 24.5 | 32.7 |
| L1 | 600 | 12.0 | 18.0 | 24.0 |
| Corresponding rated power | | ½ HP | ¾ HP | 1 HP |

TABLE 6

| Gear input line | Low gear set of rotational speed (RPM) | Fourth set of torque data (oz-ft) | Fifth set of torque data (oz-ft) | Sixth set of torque data (oz-ft) |
|---|---|---|---|---|
| L6 | 825 | 50.9 | 76.4 | 80 |
| L5 | 740 | 41.0 | 61.5 | 80 |
| L4 | 700 | 36.7 | 55.0 | 73.3 |
| L3 | 660 | 32.6 | 48.9 | 65.2 |
| L2 | 600 | 26.9 | 40.4 | 53.9 |
| L1 | 550 | 22.6 | 34.0 | 45.3 |
| Corresponding rated power | | ½ HP | ¾ HP | 1 HP |

For example, ¾ HP and 1070 RPM are indicated on the nameplate of a PSC motor to be substituted, a 1 HP ECM motor is capable of replacing the PSC motor. Gear input lines L6, L5, L4, L3, L2, and L1 are simultaneously energized; the motor is driven by the microprocessor to enter the automatic torque correction mode at the rotational speed of 1080 RMP after the microprocessor receiving the order. The rotational speed of the motor is automatically controlled at 1080 RMP, and a steady torque is calculated, providing that the steady torque Tadj=59 oz-ft (the air channel is clean and the external static pressure is relatively small). Thereafter, the first to the third torque data are detected by the program of the microprocessor, and the maximum torque values Tmax corresponding to the highest gear of the 3 low gear sets of rotational speed are 38.9, 58.4, and 77.8, respectively. The maximum torque values Tmax of 58.4 corresponding to the highest gear of the second torque data is required to satisfy condition that 110%×T[1]max<Tadj=59<=110%×T[2]max=58.4×110%. Thus, the second set of torque data are selected by the microprocessor to start the motor corresponding to the gear input lines L6, L5, L4, L3, L2, and L1. In order to improve the control accuracy, each of the torque of the second set of torque data is required to multiply a coefficient X for torque trimming, and the coefficient X=Tadj/T[2]max=59/58.4=1.0103.

The process for torque correction in conditions of a middle level external static pressure due to a relatively dirty air channel and a higher external static pressure due to a very dirty air channel is the same as that of the former example of ½ HP ECM motor.

Example 3

Figure 5A:
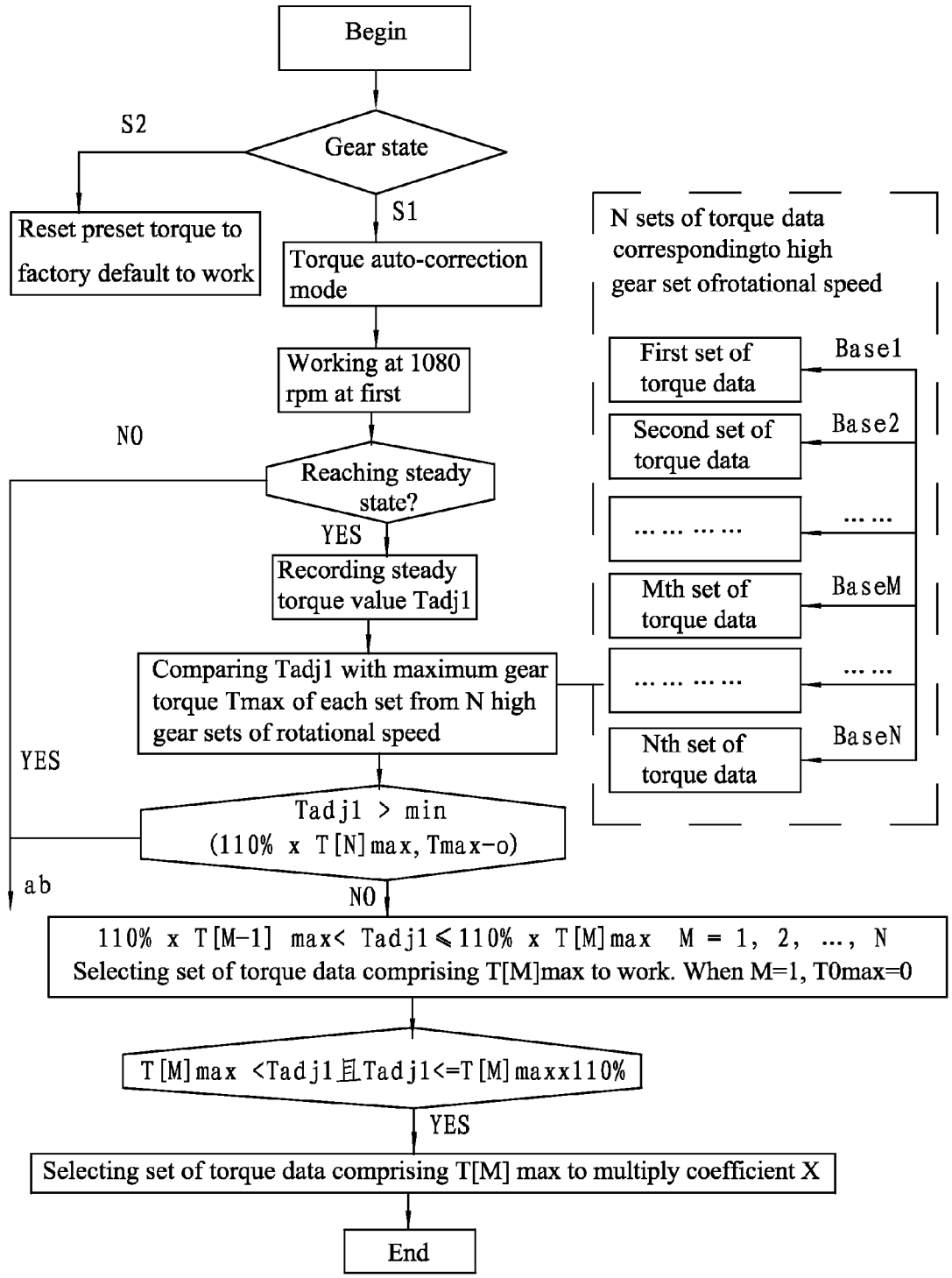
FIG. 5a is one part of a control flow diagram of a method for automatically correcting torque for substituting a PSC motor by an ECM motor of Example 3.
Figure 5B:
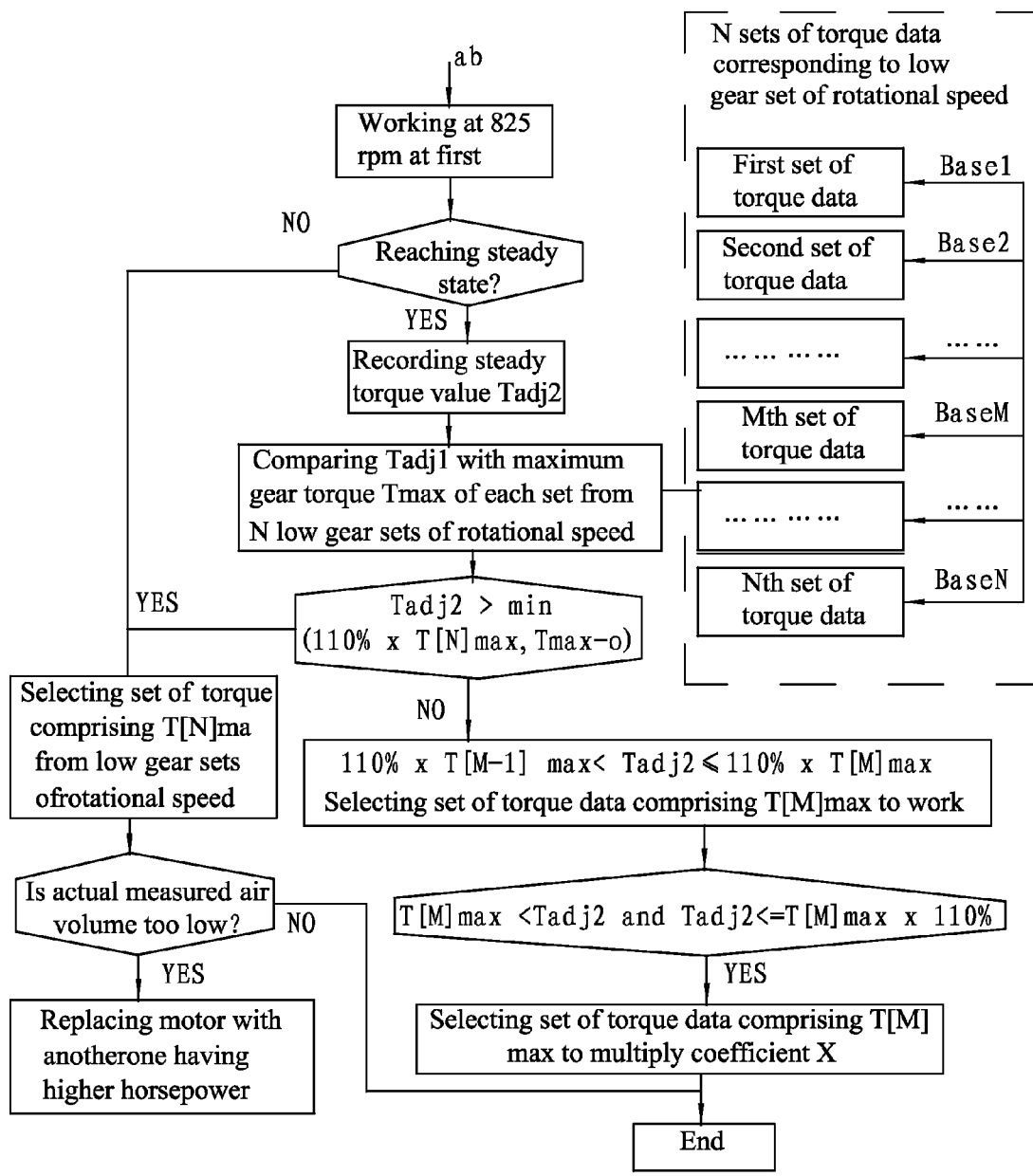
FIG. 5b is the other part of a control flow diagram of a method for automatically correcting torque for substituting a PSC motor by an ECM motor of Example 3.

As shown in FIGS. 5a-5b, a method for automatically correcting torque for substituting a PSC motor by an ECM motor. The ECM motor comprises: a stator assembly; a rotor assembly; a housing assembly; a motor controller, the motor controller comprising a microprocessor, an inverter circuit, and a gear detection circuit; and a plurality of gear input lines for controlling a rotational speed of each gear. The gear detection circuit detects an energized condition signal of the gear input line and transmits the energized condition signal to the microprocessor; and the microprocessor selects a corresponding rotational speed according to the energized condition signal of the gear input line and controls the inverter circuit to drive the stator assembly. The method comprising the following steps:

1) presetting the rotational speed of each gear according to a common rotational speed of the substituted PSC motor by corresponding gear input lines (L1, L2, L3, L4, L5, and L6) of the microprocessor; providing a certain mechanism to select one corresponding rotational speed set from two sets of rotational speed in consideration that the substituted PSC motor has 6 poles or 8 poles in actual conditions, the two sets of rotational speed comprising a high gear set of rotational speed (V1, V2, V3, V4, V5, and V6) and a low gear set of rotational speed (V01, V02, V03, V04, V05, and V06), such mechanism being the manual method of the former two examples or the method of automatically recognizing of drive software of this example; controlling a highest gear of the high gear set of rotational speed (V6) at between 900 RPM and 1200 RPM corresponding to a rated rotational speed of the PSC motor having 6 poles, controlling a highest gear of the low gear set of rotational speed (V06) at between 800 RPM and 900 RPM corresponding to a rated rotational speed of the PSC motor having 8 poles; and selecting N power points in ascending order within a range of the rated power of the motor, acquiring a set of torque data consisting of 6 output torques corresponding to the high gear set of rotational speed at each power point by calculation, acquiring a set of torque data consisting of 6 output torques corresponding to the low gear set of rotational speed at each power point by calculation, and storing a total 2×N sets of torque data by the microprocessor, in which, N sets of torque data belong to the high gear set of rotational speed, and the remaining N sets of torque data belong to the low gear set of rotational speed;
2) controlling the motor to enter an auto-correction mode by a certain mechanism, such as simultaneously energizing of a plurality of gear input lines or manually jumping wires, when the rated rotational speed of the motor on the nameplate of the substituted PSC motor is unclear and the actual data of the rated rotational speed is unknown, or when the installer wants to utilizes a much simplified method;
3) controlling the motor to operate at the highest gear of the high gear set of rotational speed (V6) by the microprocessor of the motor controller, recording a steady torque Tadj1 when the motor reaches a steady state; comparing the steady torque Tadj1 with a maximum gear torque Tmax of each of the N sets of torque data belonging to the high gear set of rotation speed, respectively; selecting the rotational speeds of the gear input lines corresponding to the set of torque data comprising T[M]max when the steady torque Tadj1 satisfies 110%×T[M−1]max<Tadj1<110%×T[M]max, M=1, 2, . . . , N; when M=1, T0max=0;

4) controlling the motor to operate at the highest gear of the low gear set of rotational speed (V06) by the microprocessor of the motor controller when step 3) is timeout and the motor is unable to reach the steady state or when the steady torque Tadj1>min (110%×T[N]max, Tmax-o), in which, min (A, B) is a function when both the minimum values of A and B are selected, and Tmax-o represents a maximum torque of the ECM motor, and recording a steady torque Tadj2 when the motor reaches a steady state; comparing the steady torque Tadj2 with a maximum gear torque Tmax of each of the N sets of torque data belonging to the low gear set of rotational speed, respectively; and selecting the rotational speeds of the gear input lines corresponding to the set of torque data comprising T[M]max when the steady torque Tadj2 satisfies 110%×T[M−1]max<Tadj2≤110%×T[M]max, M=1, 2, . . . , N; when M=1, T0max=0;

5) selecting the rotational speeds of the gear input lines corresponding to the set of torque data comprising T[N]max of the N sets of torque data belonging to the low gear set of rotational speed when the step 4) is timeout and the motor is unable to reach the steady state or when the steady torque Tadj2>min (110%×T[N]max, Tmax-o); and 6) shifting the motor from the torque correction mode after the torque value being selected according to step 5); and replacing the motor with another one having a higher horsepower when an actual measured air volume is too low when operating the motor at the highest gear V6 or V06 in a normal mode.

The high gear set of rotational speed comprises 6 gears of rotational speed (V1, V2, V3, V4, V5, and V6), in which, V6 is 1080 RPM, V5 is 975 RPM, V4 is 900 RPM, V3 is 825 RPM, V2 is 700 RPM, and V1 is 600 RPM. The low gear set of rotational speed comprises 6 gears of rotational speed (V01, V02, V03, V04, V05, and V06), in which, V06 is 825 RPM, V05 is 740 RPM, V04 is 700 RPM, V03 is 660 RPM, V02 is 600 RPM, and V01 is 550 RPM.

The set of torque data comprising a maximum toque from the high gear sets of rotational speed are selected as the set of torque data for a default state of the motor operation when the motor is directly started without executing the torque auto-correction mode or when the microprocessor is asked via a certain mechanism to reset the preset torque to a factory default.

After a set of torque data T[M] are selected, each torque of T[M] is required to multiply a coefficient X for torque trimming when the selected set of torque data T[M] satisfy the condition that T[M]max<Tadj≤110%×T[M]max and M=1, 2, . . . , N, and the coefficient X=Tadj1/T[M]max. Each of the torque of T[M] is required to multiply a coefficient X for torque trimming when the selected set of torque data T[M] satisfy the condition that T[M]max<Tadj2≤110%×T[M]max and M=1, 2, . . . , N, and the coefficient X=Tadj2/T[M]max.

For example, an ECM motor is selected to substitute a PSC motor, the ECM motor has a rated motor of ½ Hp. The rated power of the ECM motor is larger than or equal to the rated power of the PSC motor. The ECM motor is provided with 6 rotational speeds and 6 torque values as factory defaults corresponding to 6 gear input lines (L1, L2, L3, L4, L5, and L6). The 6 torque values are a default set of torque data from the factory. The ECM motor is the same as that in Example 1, and specific data are shown in Tables 1-3.

As shown in FIGS. 5a-5b, ¼ HP of the rated power is indicated on the nameplate of a PSC motor to be substituted while the rated rotational speed is unobservable, and the actual data of the rated rotational speed is unknown. A ½ HP ECM motor is capable of replacing the PSC motor. Gear input lines L6, L5, L4, L3, L2, and L1 are simultaneously energized; the motor is driven by the microprocessor to enter the automatic torque correction mode after the microprocessor receiving the order, and the motor then reaches the steady state at the rotational speed of 1080 RPM. The rotational speed of the motor is automatically controlled at 1080 RPM, and a steady torque Tadj is calculated, for example, the steady torque Tadj=25.7 oz-ft (the air channel is clean and the external static pressure is relatively small). Thereafter, the first to the fourth torque data are detected by the program of the microprocessor, and the maximum torque values Tmax corresponding to the highest gear of the 4 low gear sets of rotational speed are 15.6, 19.5, 25.9, and 38.9, respectively. The maximum torque values Tmax of 25.9 corresponding to the highest gear of the sixth torque data is required to satisfy condition that 110%×19.5<25.7≤110%×25.9. Thus, the third set of torque data are selected by the microprocessor to start the motor corresponding to the gear input lines L6, L5, L4, L3, L2, and L1.

When Tadj is larger than 42 oz-ft and the motor is unable to reach the steady state within the limited time (providing that timeout is defined as 1 min of time exceeding), the motor is controlled by the microprocessor of the motor controller to operate at the highest gear of the low gear set of the rotational speed (825 RPM), the steady torque Tadj2 is recorded when the motor reaches the steady state. Providing that the steady torque Tadj2=34.6 oz-ft (the external static pressure is relatively small when the air channel is clean), the fifth set to the eight set of the torque data are detected by the program of the microprocessor, and the maximum torque value Tmax corresponding to the highest gear of rotational speed of the 4 sets of the torque data are 20.4, 25.5, 33.9, and 42, respectively. In which, the maximum torque value Tmax 34.6 corresponding to the highest gear of rotational speed of the seventh torque data satisfies that 1.1×25.5<34.6<=1.1×33.9=37.3, thus, the seventh set of torque data are selected to be corresponding to the gear input lines L6, L5, L4, L3, L2, and L1 to operate the motor; and meanwhile, all torque values of T[3] of the seventh torque data are required to multiply the coefficient X=34.6/33.9=1.0206. When the motor is started by the above process but the actual measured air volume is still too small in air conditioner system, the motor is required to be replaced with another one having a larger horsepower, such as, replacing with a 1 HP motor.

When the motor is shifted from the automatic torque correction mode, the motor is started in the constant torque mode with the selected set of torque data T[M], and the rotational speed at the steady state is approximately equivalent to the rotational speed of each gear of the substituted PSC motor.

The invention claimed is:

1. A method for automatically correcting torque for substituting a permanent-split capacitor (PSC) motor by an electronically-commutated motor (ECM), the ECM motor comprising:
   a) a stator assembly;
   b) a rotor assembly;
   c) a housing assembly;
   d) a motor controller, the motor controller comprising a microprocessor, an inverter circuit, and a gear detection circuit; and
   e) a plurality of gear input lines for controlling a rotational speed of each gear;

wherein
    the gear detection circuit detects an energized condition signal of the gear input line and transmits the energized condition signal to the microprocessor, and the microprocessor selects a corresponding rotational speed according to the energized condition signal of the gear input line and controls the inverter circuit to drive the stator assembly; and
the method comprising the following steps:
1) presetting the rotational speed of each gear according to a common rotational speed of the substituted PSC motor by corresponding gear input lines (L1, L2, L3, L4, L5, and L6) of the microprocessor; providing a certain mechanism to select one corresponding rotational speed set from two sets of rotational speed in consideration that the substituted PSC motor has 6 poles or 8 poles in actual conditions, the two sets of rotational speed comprising a high gear set of rotational speed (V1, V2, V3, V4, V5, and V6) and a low gear set of rotational speed (V01, V02, V03, V04, V05, and V06); controlling a highest gear of the high gear set of rotational speed (V6) at between 900 RPM and 1200 RPM corresponding to a rated rotational speed of the PSC motor having 6 poles, controlling a highest gear of the low gear set of rotational speed (V06) at between 800 RPM and 900 RPM corresponding to a rated rotational speed of the PSC motor having 8 poles; and selecting N power points in ascending order within a range of the rated power of the motor, acquiring a set of torque data consisting of 6 output torques corresponding to the high gear set of rotational speed at each power point by calculation, acquiring a set of torque data consisting of 6 output torques corresponding to the low gear set of rotational speed at each power point by calculation, and storing a total 2×N sets of torque data by the microprocessor, in which, N sets of torque data belong to the high gear set of rotational speed, and the remaining N sets of torque data belong to the low gear set of rotational speed;
2) determining whether to enter the torque correction mode for operating the motor at the highest gear of the high gear set of rotational speed (V6) or at the highest gear of the low gear set of rotational speed (V06) according to the rated rotational speed on a nameplate of the substituted PSC motor;
3) selecting the high gear set of rotational speed to drive the motor to enter the torque correction mode when the rated rotational speed on the nameplate of the substituted PSC motor is between 900 RPM and 1200 RPM, and controlling the rotational speed at the highest gear of the high gear set of rotational speed (V6); selecting the low gear set of rotational speed to drive the motor to enter the torque correction mode when the rated rotational speed on the nameplate of the substituted PSC motor is between 800 RPM and 900 RPM, and controlling the rotational speed at the highest gear of the low gear set of rotational speed (V06); and recording a steady torque Tadj when the motor operates in a steady state; and
4) comparing the steady torque Tadj with a maximum gear torque Tmax of each set from the N high gear sets of rotational speed or from the N low gear sets of rotational speed; selecting the set of torque data to which T[M]max belongs when the steady torque Tadj satisfies $110\%\times T[M-1]max < Tadj \leq 110\%\times T[M]max$, $M=1, 2, \ldots, N$; when $M=1$, $T0max=0$; and after shifting the motor from the torque correction mode, using the selected set of torque data T[M] to operate the motor in a constant torque control mode when operating the motor in a common mode; wherein the rotational speed at the steady state is approximately equivalent to the rotational speed of each gear of the substituted PSC motor.

2. The method of claim 1, wherein
the high gear set of rotational speed comprises 6 gears of rotational speed (V1, V2, V3, V4, V5, and V6), in which, V6 is 1080 RPM, V5 is 975 RPM, V4 is 900 RPM, V3 is 825 RPM, V2 is 700 RPM, and V1 is 600 RPM; and
the low gear set of rotational speed comprises 6 gears of rotational speed (V01, V02, V03, V04, V05, and V06), in which, V06 is 825 RPM, V05 is 740 RPM, V04 is 700 RPM, V03 is 660 RPM, V02 is 600 RPM, and V01 is 550 RPM.

3. The method of claim 2, wherein
the 2×N sets of torque data are stored by the microprocessor in factory defaults; and
once a set of torque data are selected, the set of torque data are corresponding to the gear input lines; the microprocessor is asked by the user by a certain mechanism to select the high gear set of rotational speed or the low gear set of rotational speed to enter the torque auto-correction mode.

4. The method of claim 2, wherein the set of torque data comprising a maximum toque from the high gear sets of rotational speed are selected as the set of torque data for a default state of the motor operation when the motor is directly started without executing the torque auto-correction mode or when the microprocessor is asked via a certain mechanism to reset the preset torque to a factory default.

5. The method of claim 2, wherein after a set of torque data T[M] are selected, each torque of T[M] is required to multiply a coefficient X for torque trimming when the selected set of torque data T[M] satisfy the condition that $T[M]max < Tadj \leq 110\%\times T[M]max$ and $M=1, 2, \ldots, N$; and the coefficient $X=Tadj/T[M]max$.

6. The method of claim 2, wherein
when the motor is driven to operate at the highest gear of the high gear set of rotational speed (V6), the rotational speed is reduced successively until reaching the steady state when the motor is unable to reach the steady state within a required time; and
when the motor is driven to operate at the highest gear of the low gear set of rotational speed (V06), the rotational speed is increased successively until reaching the steady state when the motor is unable to reach the steady state within a required time, and the steady torque Tadj is recorded.

7. The method of claim 1, wherein
the 2×N sets of torque data are stored by the microprocessor in factory defaults; and
once a set of torque data are selected, the set of torque data are corresponding to the gear input lines; the microprocessor is asked by the user by a certain mechanism to select the high gear set of rotational speed or the low gear set of rotational speed to enter the torque auto-correction mode.

8. The method of claim 1, wherein the set of torque data comprising a maximum toque from the high gear sets of rotational speed are selected as the set of torque data for a default state of the motor operation when the motor is directly started without executing the torque auto-correction mode or when the microprocessor is asked via a certain mechanism to reset the preset torque to a factory default.

9. The method of claim 1, wherein after a set of torque data T[M] are selected, each torque of T[M] is required to multiply a coefficient X for torque trimming when the selected set of torque data T[M] satisfy the condition that T[M]max<Tadj≤110%×T[M]max and M=1, 2, ..., N; and the coefficient X=Tadj/T[M]max.

10. The method of claim 1, wherein
when the motor is driven to operate at the highest gear of the high gear set of rotational speed (V6), the rotational speed is reduced successively until reaching the steady state when the motor is unable to reach the steady state within a required time; and
when the motor is driven to operate at the highest gear of the low gear set of rotational speed (V06), the rotational speed is increased successively until reaching the steady state when the motor is unable to reach the steady state within a required time, and the steady torque Tadj is recorded.

11. A method for automatically correcting torque for substituting a PSC motor by an ECM motor, the ECM motor comprising:
   a) a stator assembly;
   b) a rotor assembly;
   c) a housing assembly;
   d) a motor controller, the motor controller comprising a microprocessor, an inverter circuit, and a gear detection circuit; and
   e) a plurality of gear input lines for controlling a rotational speed of each gear;
wherein
   the gear detection circuit detects an energized condition signal of the gear input line and transmits the energized condition signal to the microprocessor, and the microprocessor selects a corresponding rotational speed according to the energized condition signal of the gear input line and controls the inverter circuit to drive the stator assembly; and
the method comprising the following steps:
   1) presetting the rotational speed of each gear according to a common rotational speed of the substituted PSC motor by corresponding gear input lines (L1, L2, L3, L4, L5, and L6) of the microprocessor; providing a certain mechanism to select one corresponding rotational speed set from two sets of rotational speed in consideration that the substituted PSC motor has 6 poles or 8 poles in actual conditions, the two sets of rotational speed comprising a high gear set of rotational speed (V1, V2, V3, V4, V5, and V6) and a low gear set of rotational speed (V01, V02, V03, V04, V05, and V06); controlling a highest gear of the high gear set of rotational speed (V6) at between 900 RPM and 1200 RPM corresponding to a rated rotational speed of the PSC motor having 6 poles, controlling a highest gear of the low gear set of rotational speed (V06) at between 800 RPM and 900 RPM corresponding to a rated rotational speed of the PSC motor having 8 poles; and selecting N power points in ascending order within a range of the rated power of the motor, acquiring a set of torque data consisting of 6 output torques corresponding to the high gear set of rotational speed at each power point by calculation, acquiring a set of torque data consisting of 6 output torques corresponding to the low gear set of rotational speed at each power point by calculation, and storing a total 2×N sets of torque data by the microprocessor, in which, N sets of torque data belong to the high gear set of rotational speed, and the remaining N sets of torque data belong to the low gear set of rotational speed;
   2) controlling the motor to enter an auto-correction mode by a certain mechanism;
   3) controlling the motor to operate at the highest gear of the high gear set of rotational speed (V6) by the microprocessor of the motor controller, recording a steady torque Tadj1 when the motor reaches a steady state; comparing the steady torque Tadj1 with a maximum gear torque Tmax of each of the N sets of torque data belonging to the high gear set of rotation speed, respectively; selecting the rotational speeds of the gear input lines corresponding to the set of torque data comprising T[M]max when the steady torque Tadj1 satisfies 110%×T[M−1]max<Tadj1<110%×T[M]max, M=1, 2, ..., N; when M=1, T0max=0;
   4) controlling the motor to operate at the highest gear of the low gear set of rotational speed (V06) by the microprocessor of the motor controller when step 3) is timeout and the motor is unable to reach the steady state or when the steady torque Tadj1>min (110%×T[N]max, Tmax-o), in which, min (A, B) is a function when both the minimum values of A and B are selected, and Tmax-o represents a maximum torque of the ECM motor, and recording a steady torque Tadj2 when the motor reaches a steady state; comparing the steady torque Tadj2 with a maximum gear torque Tmax of each of the N sets of torque data belonging to the low gear set of rotational speed, respectively; and selecting the rotational speeds of the gear input lines corresponding to the set of torque data comprising T[M]max when the steady torque Tadj2 satisfies 110%×T[M−1]max<Tadj2≤110%×T[M]max, M=1, 2, ..., N; when M=1, T0max=0;
   5) selecting the rotational speeds of the gear input lines corresponding to the set of torque data comprising T[N]max of the N sets of torque data belonging to the low gear set of rotational speed when the step 4) is timeout and the motor is unable to reach the steady state or when the steady torque Tadj2>min (110%×T[N]max, Tmax-o); and
   6) shifting the motor from the torque correction mode after the torque value being selected according to step 5); and replacing the motor with another one having a higher horsepower when an actual measured air volume is too low when operating the motor at the highest gear V6 or V06 in a normal mode.

12. The method of claim 11, wherein
the high gear set of rotational speed comprises 6 gears of rotational speed (V1, V2, V3, V4, V5, and V6), in which, V6 is 1080 RPM, V5 is 975 RPM, V4 is 900 RPM, V3 is 825 RPM, V2 is 700 RPM, and V1 is 600 RPM; and
the low gear set of rotational speed comprises 6 gears of rotational speed (V01, V02, V03, V04, V05, and V06), in which, V06 is 825 RPM, V05 is 740 RPM, V04 is 700 RPM, V03 is 660 RPM, V02 is 600 RPM, and V01 is 550 RPM.

13. The method of claim 12, wherein the set of torque data comprising a maximum toque from the high gear sets of rotational speed are selected as the set of torque data for a default state of the motor operation when the motor is directly started without executing the torque auto-correction mode or when the microprocessor is asked via a certain mechanism to reset the preset torque to a factory default.

14. The method of claim 12, wherein
after a set of torque data T[M] are selected, each torque of T[M] is required to multiply a coefficient X for torque trimming when the selected set of torque data T[M] satisfy the condition that T[M]max<Tadj≤110%×T[M]max and M=1, 2, ..., N, and the coefficient X=Tadj1/T[M]max; and each of the torque of T[M] is required to multiply a coefficient X for torque trimming when the selected set of torque data T[M] satisfy the condition that T[M]max<Tadj2≤110%×T[M]max and M=1, 2, ..., N, and the coefficient X=Tadj2/T[M]max.

15. The method of claim 11, wherein the set of torque data comprising a maximum toque from the high gear sets of rotational speed are selected as the set of torque data for a default state of the motor operation when the motor is directly started without executing the torque auto-correction mode or when the microprocessor is asked via a certain mechanism to reset the preset torque to a factory default.

16. The method of claim 11, wherein
after a set of torque data T[M] are selected, each torque of T[M] is required to multiply a coefficient X for torque trimming when the selected set of torque data T[M] satisfy the condition that T[M]max<Tadj≤110%×T[M]max and M=1, 2, ..., N, and the coefficient X=Tadj1/T[M]max; and
each of the torque of T[M] is required to multiply a coefficient X for torque trimming when the selected set of torque data T[M] satisfy the condition that T[M]max<Tadj2≤110%×T[M]max and M=1, 2, ..., N, and the coefficient X=Tadj2/T[M]max.

* * * * *